United States Patent
Blunier et al.

(10) Patent No.: US 7,481,279 B2
(45) Date of Patent: Jan. 27, 2009

(54) DISC BLADE SCRAPER SYSTEM

(75) Inventors: Melvin L. Blunier, Congerville, IL (US); Marvin D. Kuebler, Goodfield, IL (US); James L. Tetrick, Washington, IL (US); Rickey L. Gerber, Roanoke, IL (US)

(73) Assignee: CNH America, LLC, Racine, WI (US)

( * ) Notice: Subject to any disclaimer, the term of this patent is extended or adjusted under 35 U.S.C. 154(b) by 301 days.

(21) Appl. No.: 11/096,400

(22) Filed: Apr. 1, 2005

(65) Prior Publication Data

US 2006/0225901 A1   Oct. 12, 2006

(51) Int. Cl.
*A01B 15/16* (2006.01)

(52) U.S. Cl. .................. 172/558; 172/509; 172/610

(58) Field of Classification Search ............. 172/558, 172/559, 572, 561, 604, 705, 560, 562, 563, 172/564, 508, 509, 606, 610; 111/111, 112, 111/163, 164, 167; 280/855, 856
See application file for complete search history.

(56) References Cited

U.S. PATENT DOCUMENTS

| | | | | |
|---|---|---|---|---|
| 435,846 A | * | 9/1890 | Maxon | 172/558 |
| 478,500 A | * | 7/1892 | Clark | 172/168 |
| 717,698 A | | 1/1903 | Miller | |
| 718,885 A | | 1/1903 | Stephenson | |
| 941,465 A | | 11/1909 | Roby | |
| 1,017,109 A | | 2/1912 | Rieske | |
| 1,113,776 A | * | 10/1914 | Goetz | 172/560 |
| 1,207,672 A | | 12/1916 | Wame | |
| 1,220,014 A | * | 3/1917 | Sherwin | 172/348 |
| 1,545,895 A | | 7/1925 | Hamilton | |
| 1,837,347 A | | 12/1931 | Vandine | |
| 1,873,307 A | | 8/1932 | Dewend | |
| 2,155,739 A | | 4/1939 | Seaholm | |
| 2,413,248 A | | 12/1946 | Seal | |
| 3,261,411 A | | 7/1966 | Youngberg et al. | |
| 3,442,336 A | * | 5/1969 | Morkoski | 172/572 |
| 3,640,348 A | * | 2/1972 | Womble | 172/572 |
| 4,127,179 A | | 11/1978 | Heersink et al. | |
| 4,724,910 A | * | 2/1988 | Wheeler | 172/464 |
| 4,828,042 A | * | 5/1989 | Arnold | 172/572 |
| 5,267,619 A | * | 12/1993 | Eversole | 172/572 |
| 6,223,832 B1 | | 5/2001 | Hook et al. | |
| 7,240,627 B1 | * | 7/2007 | Whalen et al. | 111/140 |

OTHER PUBLICATIONS

Case Corporation, MRX690 Mulch-till Ripper Parts Catalog, Mar. 2002.

* cited by examiner

*Primary Examiner*—Thomas B Will
*Assistant Examiner*—Jamie L McGowan
(74) *Attorney, Agent, or Firm*—Rebecca Henkel

(57) ABSTRACT

A scraper system to remove and deflect debris and soil from a disc gang mounted on an agricultural implement is provided. The scraper system includes a mounting bracket member supported at a common axle in support of the disc gang. The mounting bracket member is aligned generally parallel to and located forward of the common axle, and is mounted at a forward end of an elongated carry member supported from the common axle. The elongated carry member is generally aligned perpendicular relative to the common axle. A scraper blade is supported by a scraper arm mounted at the mounting bracket member and is located above the common axle. The location of the scrapper blade and the scraper arm allows a deflector plate to be located at the rearward end of the carry member.

17 Claims, 3 Drawing Sheets

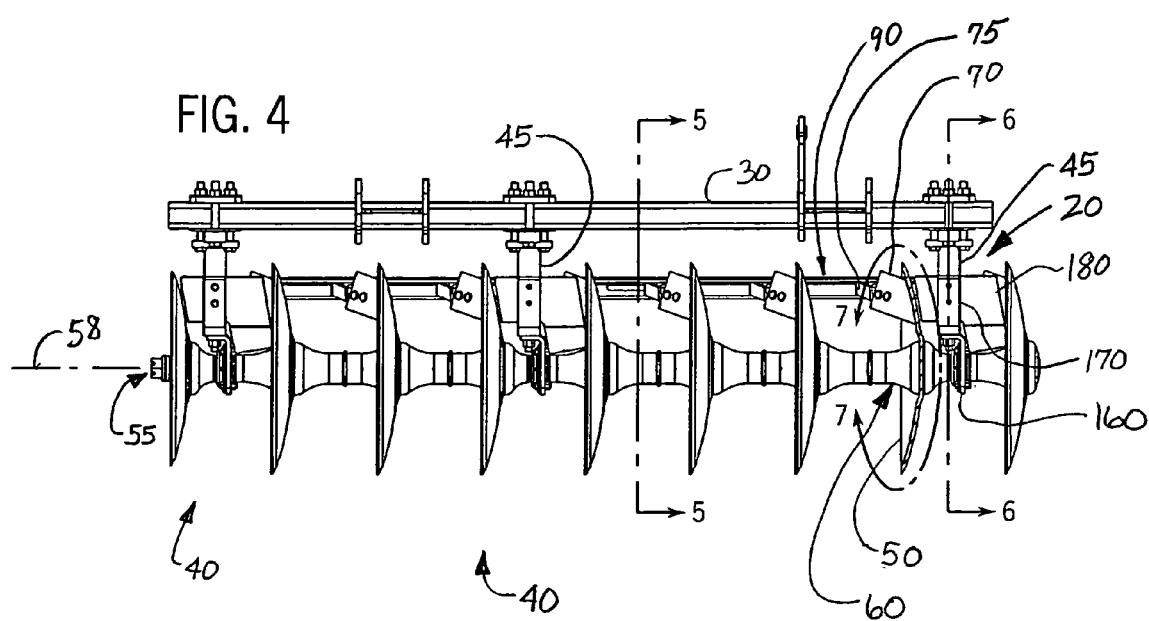

DISC BLADE SCRAPER SYSTEM

FIELD OF THE INVENTION

The invention relates to a scraper system for a disc configuration of an agricultural implement, and more specifically, relates a scraper system that includes a scraper blade and a deflector plate located above a disc gang and a deflector apparatus so as to prevent soil from being lifted upward and over the top of the disc blade gang.

BACKGROUND OF THE INVENTION

Agricultural soil preparation equipment typically includes a disc configuration to be used for breaking up and smoothing the surface of cultivated fields in preparation for planting. The disc configuration is usually drawn by a tractor or other source of motor power, multiple disc configurations are often employed, where the forward disc configuration initially breaks up lumps and clods and a rear disc configuration reduces the fragments to still smaller size and smoothing the ground.

A typical disc configuration includes a main frame with several disc gang assemblies suspended therefrom. The disc gangs are generally mounted at an angle with respect to the forward direction of travel. Each gang assembly comprises a plurality of equally spaced disc blades mounted on an axle for rotation about a common axis. The axle is supported by a series of C-shaped spring elements configured to allow the disc gangs to flex with the contour of the landscape as the agricultural implement is drawn by the tow vehicle.

In wet weather or in heavy, sticky soil conditions, earth tends to cling to the disc blades. In order to smooth the ground properly, it is desirable that this earth be removed frequently or even continuously. Otherwise the accumulation of soil and residue adhering to the discs can adversely affect disc operation. To eliminate the accumulation of soil and residue, scraper devices have been developed to keep the surfaces of the discs near their circumferences clear of the soil and residue.

U.S. Pat. No. 4,127,179 discloses a scraper mechanism for a disc gang harrow. The scraper mechanism includes a scraper blade supported from a mounting bracket fixedly attached to a tool bar of an agricultural implement to be towed. The scraper blade is generally aligned in a downward direction so as to bias against the disc blade. The disc gang is suspended from the toolbar by a series of bearing-supporting arms which carry bearing assemblies at their lower end and rotatable support of a common shaft. The scraper blades are rigidly supported to the toolbar and likewise tend to bounce in relation to the disc gang. Also, the vertically aligned scraper blades tend to yield and break from miscellaneous forces (e.g., contact with debris flow caused by cutting action of the disc blade) associated with operation in the field. When the mounting bracket or fastener breaks, the scraper arm and attached scraper blade are usually lost in the field. Also, soil and residue flow tend to be carried from the rear of the rotating blades to up and forward over the top of the disc gang spools and be trapped behind the disc gang cushion spring and on the top of the gang bearing assembly. When this happens, the soil and residue mixture can be compacted between the disc blades and the cushion spring and prevent the proper operation of the disc gang.

SUMMARY OF THE INVENTION

There is a need for a scraper system that is operable to prevent soil from being carried up and forward over the top of the disc gang spools. There is also a need for a scraper system that is located out of the primary soil path so as to minimize potential for damage to the scraper bolts and scraper mounting bracket. There is also a need for a scraper system that includes deflectors designed to deflect soil that would normally be lifted upward and over the top of the disc gang bearings and be trapped behind the cushion springs, and that operates independently of the scraper blade. There is also a need to minimize movement of the scraper system in relation to the disc gang during operation of the agricultural implement in the field. Finally, there is a need for a scraper system that does not minimizes diversion of the operator's attention from his driving.

The present invention provides a disc blade scraper system that meets the desires and needs described above. In a first embodiment of the present invention, a scraper system to remove and deflect debris and soil from a disc blade mounted on an agricultural implement is provided. The disc blade is mounted for rotation about a common axle supported by a C-shaped spring from a tool bar of an agricultural implement operable to be towed in a forward direction of travel over a soil to be worked. The scraper system in accordance with the present invention includes a mounting bracket member supported at an axle in support of the disc gang. The mounting bracket member is aligned generally parallel to and located forward of the common axle. The scraper system also includes an elongated carry member aligned generally perpendicular relative to the common axle. The elongated carry member includes a forward end in support of the mounting bracket member from the common axle. A scraper blade supported by a scraper arm member is mounted at the mounting bracket member in a generally horizontal alignment above the axle.

In the preferred embodiment of the scraper system, the mounting bracket member is located beyond a leading edge of the disc blade. The preferred mounting bracket member includes an angle bracket having an upper leg perpendicular to a forward leg. The forward end of the elongated carry member includes an upright portion having an opening therethrough configured to receive a fastener coupling the forward leg of the mounting bracket member at the elongated carry member.

The scraper system further includes a bearing support member configured to support the elongated carry member on the common axle. The elongated carry member includes a central portion that is generally linear aligned and configured to be attached at a bearing support member. In addition, the elongated carry member includes an angled portion that is generally linear aligned and located between the central linear portion and the upright portion.

The scraper system further includes a deflector plate mounted at a rearward portion of the elongated carry member. The rearward portion of the elongated carry member is configured to locate the deflector plate above and rearward relative to the common axle. The rearward portion of the elongated carry member is generally linear and aligned at an upward angle relative to horizontal to be mounted by the deflector plate so as to position the deflector plate to deflect soil and debris that would otherwise go over the top of the axle.

In another embodiment, the present invention provides an agricultural implement configured to be towed in forward direction of travel. The implement comprising a disc gang mounted for rotation on an axle supported from a tool bar. The disc gang includes a disc blade separated by a spool from an adjacent disc blade. The implement also includes a scraper system operable to remove soil carried on the disc blade. The scraper system includes a mounting bracket member supported at an axle in support of the disc gang. The mounting bracket member is aligned generally parallel to a tool bar of the implement and located forward of the axle relative to the direction of travel of the implement. The scraper system also includes an elongated carry member generally aligned in a fore and aft direction and having a forward end in support of the mounting bracket member from the axle. A scraper blade supported by a scraper arm member is mounted at the mounting bracket and located above the axle. The scraper blade is operable to remove soil carried on the rotating disc blade before the soil is carried over the axle and the spool.

In accordance with another aspect of the invention, a method of operating a disc scraper system is provided, substantially in accordance with the foregoing summary.

Other objects, features, and advantages of the invention will become apparent to those skilled in the art from the following detailed description and accompanying drawings. It should be understood, however, that the detailed description and specific examples, while indicating preferred embodiments of the present invention, are given by way of illustration and not of limitation. Many changes and modifications may be made within the scope of the present invention without departing from the spirit thereof, and the invention includes all such modifications.

BRIEF DESCRIPTION OF THE DRAWINGS

Preferred exemplary embodiments of the invention are illustrated in the accompanying drawings in which like reference numerals represent like parts throughout.

FIG. 4 illustrates a detailed rear view of the scraper system and the disc gang shown in FIG. 1.

FIG. 5 illustrates a detailed side elevation view along line 5-5 in FIG. 4.

FIG. 6 illustrates a detailed side elevation view along line 6-6 in FIG. 4.

FIG. 7 illustrates a detailed side elevation view along line 7-7 in FIG. 4.

DETAILED DESCRIPTION OF THE PREFERRED EMBODIMENTS

Figure 1:
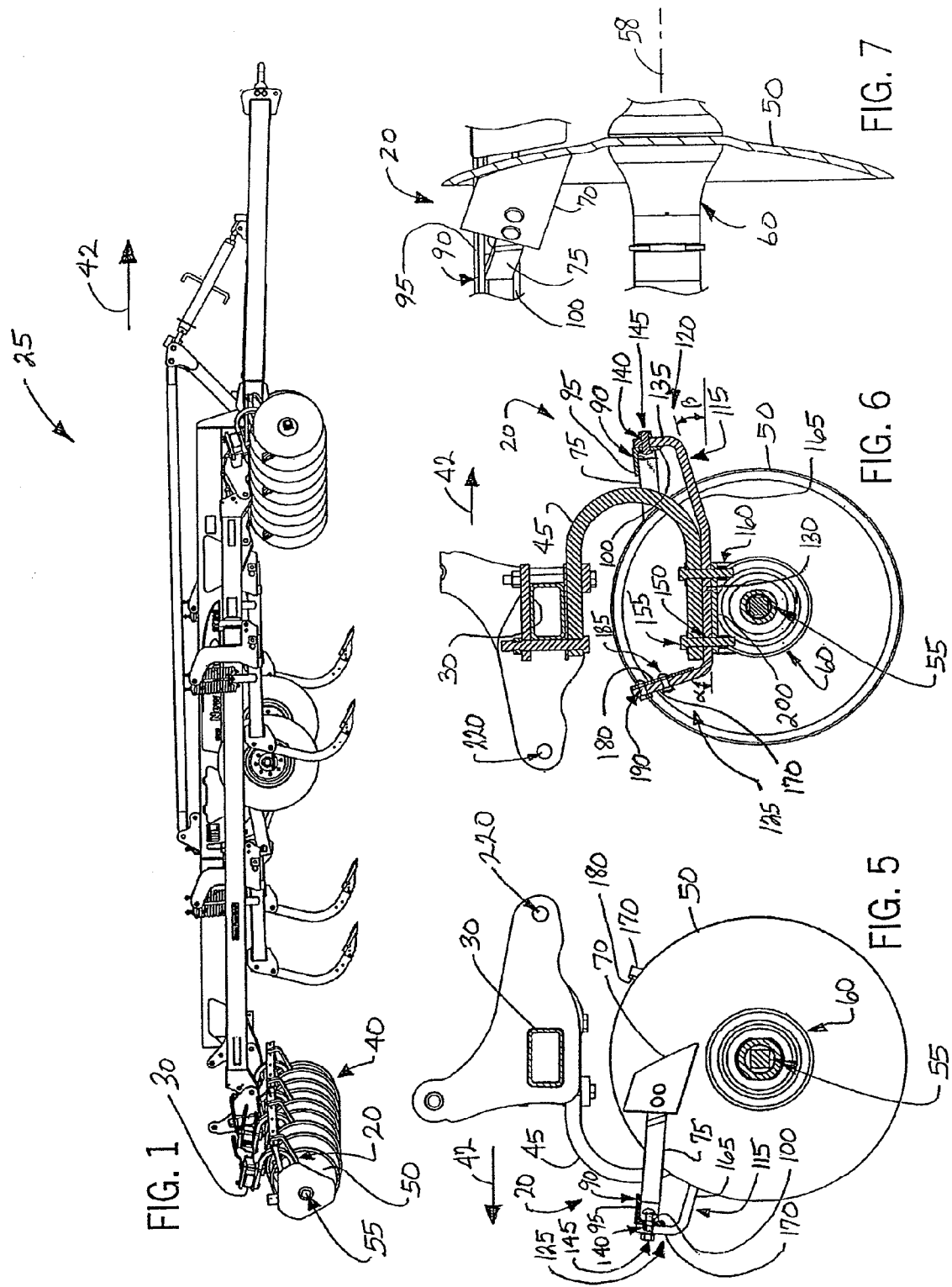
FIG. 1 illustrates a scraper system in accordance with the present invention in combination with a disc gang of an agricultural tillage implement.

FIG. 1 shows a preferred embodiment of a scraper system 20 employed on an agricultural tillage or soil working implement 25. The agricultural implement 25 includes a tube or tool bar 30 in support of one or more disc gangs 40 operable to break up lumps and/or clods and/or soil to smaller sized fragments and for smoothing the ground.

The illustrated agricultural implement 25 is commonly referred to as a disk-ripper-disk ("DRD") or a mulch ripper disk implement. This implement 25 includes one or more conventional disk gangs 40 at the front and rear of the implement 25, with ripper shanks disposed therebetween. A preferred implement 25 is manufactured by CNH LLC, IH model MRX690 or NH model ST740. The one or more disc gangs 40 are supported from the toolbar 30 so as to be to be towed in a forward direction (illustrated by the arrow and reference 42) over the soil where crop residue or other trash is present. The implement 25 further includes a series of C-shaped spring elements 45 (See FIGS. 5 and 6) configured in a convention manner to support the disc gang 40 from the toolbar 30.

Figures 2, 3:
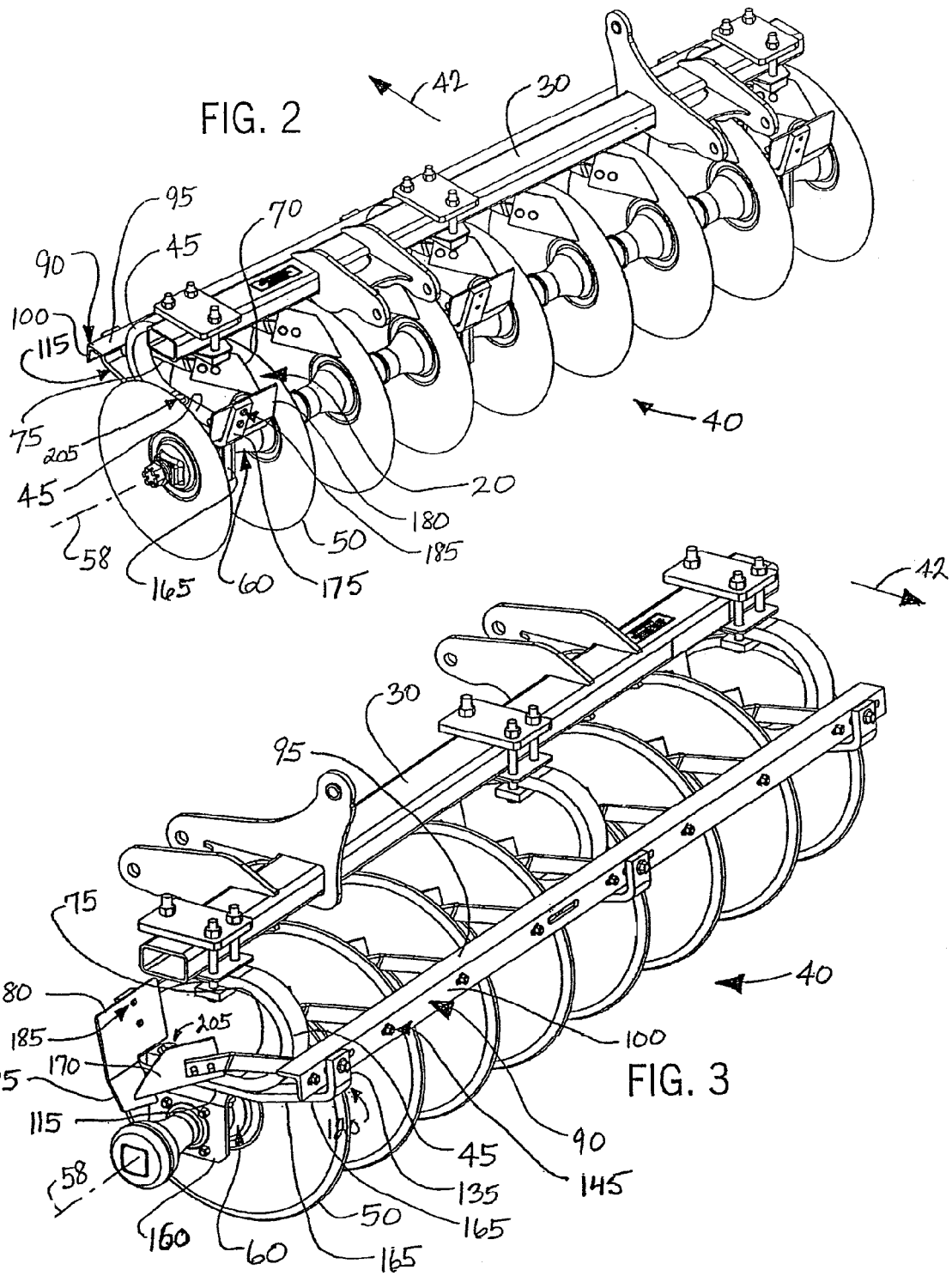
FIG. 2 illustrates a detailed rearward perspective view of the scraper system and the disc gang shown in FIG. 1.
FIG. 3 illustrates a detailed forward perspective view of the scraper system and the disc gang shown in FIG. 1, the end disc blade removed.

Referring to FIGS. 2-4, the preferred disc gang 40 generally includes a series of transversely spaced disc blades 50 mounted for rotation in unison on a common axle 55 extending generally parallel to the toolbar 30. The common axle 55 is defined by axis 58. The series of disc blades 50 are slidably spaced apart from one another by conventional sleeves or spools 60 along the common axle 55. The spools 60 in combination with conventional bearing assemblies (not shown) are operable to rotatably support the disc gang 40 on the common axle 55. As the toolbar 30 and disc gang 40 are moved in the forward direction through the soil, the disc gang 40 is operable in a conventional manner break-up lumps and clods of soil and debris, to reduce fragments to still smaller-size, and to smooth the soil surface in preparation for planting.

Yet, dirt and debris tend to build up on the surfaces of the disc gang 40 between the individual disc blades 50. This dirt and debris must be removed to maintain good operation of the disc gang 40 in properly working the soil. To remove the dirt and debris, the scraper system 20 in accordance with the present invention is provided.

Referring to FIGS. 5-7, the preferred scraper system 20 generally includes a scraper blade 70 biased in engagement by a scraper arm member 75 against each disc blade 50 of the disc gang 40. The scraper blade 70 is generally located an angle to effect a scraping action on the concave sides of the disc blade 50 in a conventional manner. The shape of the disc blade 50 is generally compatible with the concave surface of the disc blade 50 so as to effectively remove soil and debris therefrom. The location of the scraper blade 70 relative to the respective disc blade 50 is generally identical for each of the series of disc blades 50 of the disc gang 40.

Referring specifically to FIG. 5, the scraper arm member 75 is configured to support and bias the scraper blade 70 against the surface of the disc blade 50. This alignment of the scraper arm member 75 holds the scraper blade 70 above the spool 60 in a manner that enhances removal of soil and debris attached to the disc blade 50. This alignment and location of the scraper arm member 75 also places the scraper blade 70 above the spool 60 at a location out of the primary soil flow path, minimizing the potential for damage to the scraper arm member 75 and the scraper blade 70. The preferred scraper arm member 75 generally includes a linear elongated metallic piece comprised of spring steel or other appropriate material operable to maintain a bias of the scraper blade 70 against the disc blade 50.

Referring now to FIGS. 3 and 5-6, the scraper system 20 further includes a mounting bracket member 90 in support of the scraper arm member 75 and the scraper blade 70. The mounting bracket member 90 extends generally parallel to the axis 58 of the common axle 55. The preferred mounting bracket member 90 is an angle bracket having an upper leg 95 aligned generally perpendicular relative to a forward leg 100. The scraper arm member 75 is attached in general parallel alignment with the upper leg 95 of the mounting bracket member 90. Yet, although an angle bracket is shown, it is understood that the type of mounting bracket member 90 (e.g., an elongated rod, a tubular structure, etc.) can vary.

As illustrated in FIGS. 3 and 6, the scraper system 20 further includes an elongated carry member 115 in support of the mounting bracket member 90 from the axle of the disc gang 40. The elongated carry member 115 is generally aligned perpendicular relative to the axis 58 of the common axle 55 (See FIG. 3). The elongated carry member 115 generally includes a forward end 120, a rearward end 125, and a central portion 130 therebetween. The forward end 120 includes an upright portion 135. The upright portion 135 includes an opening 140 extending therethrough configured to receive a fastener 145 coupling the forward leg 100 of the mounting bracket member 90 at the elongated carry member 115. The central portion 130 of the elongated carry member 115 is generally linear aligned and includes one or more openings 150 therethrough configured to receive one or more respective fasteners 155 to mount the elongated carry member 115 at a bearing support member 160 mounted on the common axle 55 of the disc gang 40.

Still referring to FIGS. 3 and 6, the carry member 115 also includes an angled portion 165 that is generally linear-aligned and located between the central portion 130 and the upright portion 135. The angled portion 165 is generally aligned at angle (β) with respect to the central portion 130 (See FIG. 6). The angle (β) can vary to provide the desired location of the scraper blade 70 at the disc blade 50, as well as to provide desired clearance of the scraper arm member 75 and the scraper blade 70 from the normal flow path of soil and debris associated with operation of the implement 25 in the field. This angle (β) can vary with the radius of curvature of the disc blade 50, and with the location of the disc gang 40 (e.g., the angle (β) can greater for the disc gang 40 at the rear of the implement 25 relative to the front of the implement 25). The rearward end 125 of the carry member 115 includes a rearward portion 170 that is generally linear and aligned at an upward angle (α) relative to the central portion 130 (See FIG. 6).

Still referring to FIGS. 3 and 6, the scraper system 20 further includes a deflector plate 180 generally configured to deflect the soil and debris that is carried up and over the axle 55 and spool 60. The configuration and location of the mounting bracket member 90, the scraper arm member 75 and the scraper blade 70 at the forward end 120 of the elongated carry member 115 allows the deflector plate 180 to be located rearward and above the common axle 55 without interference with operation of the scraper blade 70. To provide clearance above the normal soil path, the deflector plate 180 is supported at the upward angle (α) defined by the rearward portion 170 of the elongated carry member 115. The deflector plate 180 is attached by one or more fasteners 185 extending through respective openings 190 at the rearward portion 170 of the elongated carry member 115 above and rearward of the axle 55. The preferred deflector plate 180 is generally rectangular-shaped. The illustrated deflector plate 180 further includes a lower leg portion 195 that extends below the elongated carry member 115. The preferred deflector plate 180 is a metallic plate member, but the other types of materials appropriate for operation in the field can be used.

As shown in FIGS. 3 and 6, the bearing support member 160 is generally configured to receive the axle 55 therethrough and support the C-shaped spring element 45 and the scraper system 20 on the axle 55 of the disc gang 40. The bearing support member 160 includes a horizontal flange member 200 to be mounted by the central portion 130. The horizontal flange member 170 includes an opening configured to receive a fastener 205 coupling the C-shaped spring element 45 and the carry member 115 to the bearing support member 160. The location of the carry member 115 between the C-shaped spring element 45 and the horizontal flange member 170 reduces undesired movement of the mounting bracket member 90, the scraper arm member 75, the disc scraper blade 70, and the deflector blades 180 relative to the disc blade 50 caused by miscellaneous forces associated with operation of the implement 25 in the field.

The bearing support member 160 is operable to rotate with adjustment of the disc gang 40 about a pivot hole 220 in a conventional manner to selectively adjust for desired depth of cut of the disc blade 50 into the soil. Thereby, the carry member 115, the mounting bracket member 90, the scraper arm member 75, and the scraper blade 70 can be selectively adjusted in rotational angular position relative to the disc blade 50. Although rotational adjustment about the pivot hole 220 is illustrated, an alternative is to fix the angular position of the scraper system 20 while adjusting for the depth of cut of the disc gang 40.

In contrast, known scraper systems are supported from the tool bar 30. This known configuration tends to cause known scraper systems to vibrate with the tool bar 30 and the C-shaped spring 45 supported therefrom with respect to the disc gang 40, disrupting the operation of known scraper systems.

In operation, the scraper blade 70 of the scraper system 20 of the present invention is configured to engage the concave surface of each of the disc blades 50 of disc gang 40 of an agricultural implement 25. As agricultural implement 25 is towed across the field, the scraper system 20 removes soil or debris carried on the disc blade 50. The scraper blade 70 is supported by a scraper arm member 75 attached at the mounting bracket member 90. The scraper blade 70 is located forward and above the spool 60 relative to the direction of travel 42 so as to be above the general soil path of the debris and soil associated operation of the disc gang 40. The deflector plate 180 is located above and rearward of the spool 60 so as to deflect soil and debris carried up by the disc blade 50. The configuration of the elongated carry member 115 locates the mounting bracket member 90, the scraper arm member 75 and the scraper blade 70 at the proper location above the spool 60 and relative to the disc blade 50, as well as above the primary flow of soil and debris associated with operation of the disc blade 50 in the field. The carry member 115 is mounted at a bearing support member 160 mounted on the axle 55 of the disc gang. Thereby, as the C-shaped spring elements 45 flexes vertically and laterally in association with travel of the disc gang 40 over rough terrain of the field, the location of the scraper system 20, including the scraper blade 70, the scraper arm member 75, the mounting bracket member 90, the elongated carry member 115, and the deflector plate 180, will move with the disc blade 50. In particular, the scraper blade 70 will remain in engagement with the disc blade 50. In contrast, known scraper systems that are supported from the tool bar 30 are known to deflect or move away from engagement with the disc blade 50 as the C-shaped spring elements 45 flexes vertically and laterally with travel of the disc gang 40 over rough terrain.

While the invention has been shown and described with respect to particular embodiments, it is understood that alternatives and modifications are possible and are contemplated as being within the scope of the present invention. For example, although the above described scraper system 20 is described with reference to DRD implement 25, one skilled in the art will recognize that the present invention is not so limited. A wide variety of ground-engaging implements (e.g., conventional disc harrow) can employ the scraper system 20 of the present invention. In addition, it should be understood that the number of scraper systems 20 employed on the implement 25 is not limiting on the invention.

Many changes and modifications could be made to the invention without departing from the spirit thereof. The scope of these changes will become apparent from the appended claims.

We claim:

1. An agricultural implement configured to be towed in forward direction of travel, comprising:
   a disc gang mounted for rotation on a common axle supported from a tool bar operable to be towed in the forward direction of travel, the disc gang including a disc blade separated by a spool from an adjacent disc blade;
   a scraper blade system operable to remove soil carried on the disc blade, comprising,
      a mounting bracket member aligned generally parallel to and located forward of the common axle,
      an elongated carry member having a forward end in support of the mounting bracket member on the common axle independent of a spring element between the tool bar and the common axle,
      the elongated carry member generally aligned perpendicular to, and located above relative to the common axle, and
      a scraper blade supported by a scraper arm member mounted at the mounting bracket bracket;
   a deflector plate mounted at a rearward end of the elongated carry member and projecting laterally therefrom, the deflector plate including deflector portion being generally flat and extending upwardly and rearwardly of the common axle;
   wherein:
      the deflecting portion of the deflector plate has a first end proximate to the disc blade and a second end proximate to the adjacent disc blade; and
      the scraper blade is operable to remove soil carried on the rotating disc blade.

2. The agricultural implement as recited in claim 1, wherein the deflector plate includes a lower leg portion that extends below the elongated carry member.

3. The agricultural implement as recited in claim 1, wherein the elongated carry member includes a forward end having an opening therethrough configured to receive a fastener coupling the mounting bracket member at the elongated carry member.

4. The agricultural implement as recited in claim 1, further comprising:
   a bearing support member mounted at the common axle of the disc gang,
   wherein the spring element includes a C-shaped spring element, and
   wherein the bearing support member supports the C-shaped spring element and the elongated carry member on the common axle.

5. The agricultural implement as recited in claim 4, wherein the elongated carry member includes a central portion that is generally linear aligned and positioned over the common axle, and wherein the central portion includes an opening configured to receive a fastener to attach the elongated carry member at the bearing support member.

6. The agricultural implement as recited in claim 5, wherein the elongated carry member includes a forward end and an angled portion that is generally linear aligned and located between the forward end and the central portion.

7. The agricultural implement as recited in claim 5, wherein the elongated carry member includes a rearward end having a rearward portion aligned at upright angle relative to the central portion.

8. The agricultural implement as recited in claim 1, wherein the mounting bracket member includes an angle bracket having an upper leg generally aligned perpendicular relative to a forward leg, and wherein the scraper arm member is generally aligned parallel to the upper leg of the mounting bracket member.

9. A scraper system for a disc blade mounted for rotation about an axle, the axle supported by a C-shaped spring from a tool bar of an agricultural implement operable to be towed in a forward direction of travel over a soil to be worked, the disc blade spaced by a spool from an adjacent disc blade, comprising:
   a mounting bracket member supported at the common axle of the implement, the mounting bracket member aligned generally parallel and located forward relative to the common axle;
   an elongated carry member having a forward end mounted to and supporting the mounting bracket member, a central portion supported by the axle and a rearward portion, the elongated carry member being generally aligned perpendicular to the common axle;
   a deflector plate mounted at the rearward portion of the elongated carry member and projecting laterally therefrom, the deflector plate having a deflecting portion being generally flat and lying in a plane extending upwardly and rearwardly relative to the common axle, wherein the deflecting portion of the deflector plate has a first end proximate to the disc blade, a second end proximate to the adjacent disc blade and is generally configured to deflect debris being carried up and over the common axle; and
   a scraper blade supported by a scraper arm mounted at the mounting bracket member and located above the common axle,
   wherein the scraper blade is operable to remove soil carried on the rotating disc blade.

10. The scraper system as recited in claim 9, wherein the mounting bracket member includes an angle bracket having an upper leg aligned generally perpendicular relative to a forward leg.

11. The scraper system as recited in claim 9, wherein the deflector plate includes a lower leg portion that extends below the elongated carry member.

12. The scraper system as recited in claim 9, further comprising:
   a bearing support member configured to support the elongated carry member on the common axle.

13. The scraper system as recited in claim 12, wherein the elongated carry member includes a central portion that is generally linear aligned and configured to be attached at the bearing support member.

14. The scraper system as recited in claim 13, wherein the elongated carry member includes an angled portion, the angled portion being generally linear aligned and located between the central portion and a forward end of the elongated carry member.

15. The scraper system as recited in claim 13, wherein the elongated carry member includes a rearward portion located between a rearward end and the central portion, the rearward portion being generally linear and aligned at an upward angle relative to the central portion of the elongated carry member.

16. The scraper system as recited in claim 9, wherein a forward end of the elongated carry member includes an upright portion having an opening therethrough configured to receive a fastener coupling the mounting bracket member at the elongated carry member.

17. A method of scraping a disc blade of a disc gang mounted for rotation on a common axle supported from a tool bar of an agricultural implement configured to be towed in a forward direction of travel, the plurality of disc blades separated from one another by a spool, the common axle coupled by a C-shaped spring element to the tool bar, the method comprising the steps of:

removing soil or debris carried on the disc blade with a scraper blade, the scraper blade supported by a scraper arm member attached at the mounting bracket member located forward and above relative to the common axle;

deflecting soil being carried over the axle with a deflector plate having a deflecting portion being generally flat and extending upwardly and rearwardly relative to the common axle, the deflecting portion of the deflector plate having a first end proximate to the disc blade and a second end proximate to the adjacent disc blade such that the deflected soil passes between adjacent disc blades onto a supporting surface on which the agricultural implement travels;

supporting the scraper blade and the deflector plate on the common axle independent of the C-shaped spring element; and supporting the mounting bracket member at one end of an elongated carry member and the deflector plate at the other end of the elongated carry member, the elongated carry member attached at a bearing support member mounted on the common axle.

* * * * *